Patented Nov. 1, 1932

1,886,310

UNITED STATES PATENT OFFICE

WALDO L. SEMON, OF CUYAHOGA FALLS, OHIO, ASSIGNOR TO THE B. F. GOODRICH COMPANY, OF NEW YORK, N. Y., A CORPORATION OF NEW YORK

RUBBER COMPOSITION AND METHOD OF PREPARING THE SAME

No Drawing.   Application filed April 18, 1931. Serial No. 531,253.

This invention relates to the art of rubber manufacture, and particularly to certain improved rubber compositions and their preparation.

It has heretofore been observed that rubber goods manufactured by the usual processes of masticating the rubber with pigments, fillers, reinforcing agents, vulcanizing agents, etc., shaping it and vulcanizing it, suffers from numerous faults. These include a comparatively rapid deterioration due largely to oxidation, rapid failure of heavily pigmented goods due to the presence of poorly or incompletely dispersed pigments, and excessive heating of rubber goods subjected to rapidly repeated flexing.

The objects of this invention accordingly include the provision of a rubber composition which will resist deterioration, whether due to oxidation, to mechanical deformation, or to the heating accompanying rapidly repeated flexing or straining, far more effectively than compositions hitherto known. Another object is to provide a new method of preparing rubber compositions, whereby finely-divided pigments are more intimately and homogeneously incorporated in the rubber than has been possible in the past. Another object is to provide a method for incorporating finely divided pigments into rubber, even in large volumes, with a minimum expenditure of time and labor. A further object is to provide a method for retarding the deterioration of rubber compositions. Other objects will be apparent from the following description of the invention.

The objects of this invention are accomplished by mixing with the rubber before vulcanization an amide of a primary aromatic amine with a non-volatile fatty acid. This class of compounds is readily prepared simply by heating the aromatic amine and the fatty acid in equivalent proportions to eliminate water. The class is of considerable scope and includes the amides prepared from both unsubstituted and substituted amines and acids. For example any substantially non-volatile fatty acid such as caproic acid, caprylic acid, lauric acid, palmitic acid, daturic acid, stearic acid, arachidic acid, lignoceric acid, or an unsaturated acid such as oleic acid, linoleic acid, linolenic acid, or substituted acids such as ricinoleic acid or even the resin acids such as abietic acid or ordinary rosin, Burgundy pitch, Venice turpentine, pine tar, or shellac, or other mixtures of any of the above acids may be combined with such aromatic amines as aniline, toluidine, xylidine, cumidine, naphthylamine, amino anthracene, aminobiphenyl, phenylene diamine, toluylene diamine, naphthylene diamine, benzidine, tolidine, dianisidine, p-amino dimethylaniline, amino diphenylamine, diamino diphenylamine, diamino diphenyl methane, diamine diphenyl dimethyl methane, diamino diphenyl ether, aminophenol, aminonaphthol, chloraniline, nitraniline, anisidine, phenetidine, amino benzyl alcohol, etc. The constituent substances should, however, be free from strongly acid radicals, which undesirably retard the vulcanization of the rubber.

The amides of the class outlined above are in general practically neutral substances of high boiling point but with comparatively low melting points. Certain of them are are oily liquids while others are soft crystalline solids which are readily broken down by the application of a slight pressure. They are soluble in rubber and are very readily incorporated in rubber by the usual process of mastication on the roll mill or in a kneading machine or "internal mixer."

The amides of primary aromatic amines with non-volatile fatty acids exhibit the peculiar property of softening compositions containing large proportions of finely divided pigment, while they do not appreciably affect the consistency of the so-called "pure gum" compositions. This property is of great value in the preparation of technical rubber compositions which are required to contain finely divided pigments such as zinc oxide, whiting, blanc fixe, clay, gas black, etc., for the purpose of increasing the stiffness of the rubber, modifying its electrical properties, reducing its cost, increasing its resistance to abrasion and to tearing, etc. A small proportion of one of these amides added to such a rubber composition greatly increases its workability, rendering it soft and plastic so that it is readily and smoothly processed in the calender or extrusion machine without exhibiting undue swelling or shrinking or excessive calender grain. The rubber after vulcanization exhibits all of the desirable properties of the same composition without the amide, but to an enhanced degree, because of the more intimate and uniform admixture of the pigments with the rubber which is made possible by the softness and plasticity imparted by the amide to the unvulcanized composition. However, the vulcanized composition is not rendered weak and flabby as would be the case if other previously known softeners such as mineral oils had been employed for the same purpose.

The amides of this invention possess a marked anti-oxidant power and conseqently prolong the useful life of rubber goods containing them. This is particularly true of the amides derived from amines containing two aromatic rings, such as naphthylamine (the naphthyl nucleus of which contains two conjugated rings), amino biphenyl, amino diphenyl ether, and diamino diphenyl methane; and of the amides in which the aromatic nucleus contains a hydroxyl or amino group, including the amides of the aminophenols, amino diarylamines, alkyl or unsymmetrical dialkyl aromatic diamines, and those obtained by reacting aromatic primary diamines with an equimolecular proportion of a fatty acid so as to leave one free amino group. They also activate certain accelerators of vulcanization to an appreciable extent, especially sulphur-containing accelerators such as tetramethyl thiuram disulphide and mercaptobenzothiazole. The most effective substances in this particular are again those having a free amino group.

The amides derived from volatile fatty acids such as formic or acetic acid possess characteristics quite different from those of the amides enumerated above, and do not exhibit the beneficial properties of the substances of this invention. They are therefore excluded from the scope of the claims of this invention.

Although it is preferred to react the amine and the acid in equivalent proportions as described above, an excess of either the acid or the amine may be employed if desired, in order to modify the properties of the amide. On the other hand, the amide may be prepared from a mixture of different acids or amines, or different amides may be prepared separately and incorporated into rubber together. The amides may likewise be employed in admixture with organic or inorganic powdered solids, with accelerators, softeners, anti-oxidants, or any other substances which are to be incorporated into rubber.

As a specific example of one manner of practicing this invention, a typical tire tread composition is prepared containing rubber 100 parts by weight, sulphur 5.5 parts, zinc oxide 30 parts, gas black 40 parts, mineral rubber 10 parts, palm oil 5 parts, hexamethylene tetramine 0.75 parts, and oleanilide (prepared by the reaction of oleic acid and aniline) 1.9 parts. This composition is more readily mixed than a similar composition without the oleanilide, and is very markedly more plastic. It is readily calendered or extruded and when thus processed exhibits a smooth even surface, while the composition without the oleanilide is harsh and dry, with a tendency to roughness of the surface. Nevertheless, the physical properties of the two compositions after vulcanization in a press for 45 minutes at 294° F. are practically identical, although the composition containing the oleanilide resists mechanical stresses more effectively because of its greater homogeneity. Comparable results are attained with other amides such as lauranilide or stearanilide, or with other rubber compositions containing appreciable proportions of finely divided pigments.

When the amide obtained by the reaction of alpha-naphthylamine and rosin, or of p-aminophenol or amino-diphenylamine and stearic acid is substituted for the oleanilide in the above example, the vulcanized composition, in addition to the other advantages enumerated above, acquires the ability to resist the deterioration due to heat or to oxidation for about twice the length of time required for compositions without these amides.

This invention is a continuation in part of my copending application, Serial No. 301,933, filed August 17, 1928.

While I have herein disclosed with considerable particularity certain preferred manners of performing my invention, I do not thereby desire or intend to limit myself solely thereto for, as hitherto stated, the procedure may be modified, the precise proportion of the materials utilized may be varied, and other materials having equivalent properties may be employed if desired without departing from the spirit and scope of the invention as defined in the appended claims.

I claim:

1. The method of preparing a rubber composition which comprises incorporating into rubber a small proportion of the product of the reaction of a primary aromatic amine and a non-volatile fatty acid with the elimination of water.

2. The method of preparing a rubber composition which comprises incorporating into rubber a small proportion of the amide of a primary aromatic amine and a non-volatile fatty acid, and vulcanizing the rubber.

3. The method of preparing a rubber composition which comprises incorporating into rubber a finely divided pigment and a small proportion of the amide of a primary aromatic amine and a non-volatile fatty acid, and vulcanizing the rubber.

4. The method of preparing a rubber composition which comprises incorporating into rubber a small proportion of the amide of a primary aromatic amine containing two aromatic rings and a non-volatile fatty acid, and vulcanizing the rubber.

5. The method of preparing a rubber composition which comprises incorporating into rubber a small proportion of the amide of a primary aromatic amine containing two aromatic rings and a resin acid, and vulcanizing the rubber.

6. The method of preparing a rubber composition which comprises incorporating into rubber a small proportion of the amide of naphthylamine and rosin, and vulcanizing the rubber.

7. The method of preparing a rubber composition which comprises incorporating into rubber a small proportion of the amide of a hydroxy substituted primary aromatic amine and a non-volatile fatty acid, and vulcanizing the rubber.

8. The method of preparing a rubber composition which comprises incorporating into rubber a small proportion of the amide of an amino substituted primary aromatic amine and a non-volatile fatty acid, and vulcanizing the rubber.

9. The method of preparing a rubber composition which comprises incorporating into rubber a finely divided pigment and a small proportion of the amide of a p-aminophenol and a non-volatile fatty acid, and vulcanizing the rubber.

10. The method of preparing a rubber composition which comprises incorporating into rubber a finely divided pigment and a small proportion of the amide of a p-amino substituted primary aromatic amine and a non-volatile fatty acid, and vulcanizing the rubber.

11. The method of preparing a rubber composition which comprises incorporating into rubber a finely divided pigment and a small proportion of the amide of a primary aromatic amine containing a hydrocarbon substituted amino group in the para position and a non-volatile fatty acid, and vulcanizing the rubber.

12. A composition comprising rubber and the product of the reaction of a primary aromatic amine and a non-volatile fatty acid with the elimination of water.

13. A vulcanized rubber composition comprising the amide of a primary aromatic amine and a non-volatile fatty acid.

14. A vulcanized rubber composition comprising a finely divided pigment and the amide of a primary aromatic amine and a non-volatile fatty acid.

15. A vulcanized rubber composition comprising the amide of a primary aromatic amine containing two aromatic rings and a non-volatile fatty acid.

16. A vulcanized rubber composition comprising the amide of a primary aromatic amine containing two aromatic rings and a resin acid.

17. A vulcanized rubber composition comprising the amide of a hydroxy substituted primary aromatic amine and a non-volatile fatty acid.

18. A vulcanized rubber composition comprising the amide of a p-aminophenol and a non-volatile fatty acid.

19. A vulcanized rubber composition comprising the amide of an amino substituted primary aromatic amine and a non-volatile fatty acid.

20. A vulcanized rubber composition comprising the amide of a primary aromatic amine containing a hydrocarbon substituted amino group in the para position and a non-volatile fatty acid.

In witness whereof I have hereunto set my hand this 16th day of April, 1931.

WALDO L. SEMON.